(12) United States Patent
Vallvé Bertran et al.

(10) Patent No.: US 12,546,093 B2
(45) Date of Patent: Feb. 10, 2026

(54) WEAR ELEMENT FOR AN EARTH-MOVING MACHINE, CORRESPONDING MEASURING DEVICE AND MACHINE

(71) Applicant: METALOGENIA RESEARCH & TECHNOLOGIES S.L., Barcelona (ES)

(72) Inventors: Nil Vallvé Bertran, Barcelona (ES); Justo Jesús Ortiz García, Barcelona (ES); Jordi Marquez Llinas, Barcelona (ES); Javier Triginer Castañé, Barcelona (ES)

(73) Assignee: Metalogenia Research & Technologies S.L., Barcelona (ES)

( * ) Notice: Subject to any disclaimer, the term of this patent is extended or adjusted under 35 U.S.C. 154(b) by 628 days.

(21) Appl. No.: 17/921,443

(22) PCT Filed: Apr. 26, 2021

(86) PCT No.: PCT/EP2021/060850
§ 371 (c)(1),
(2) Date: Oct. 26, 2022

(87) PCT Pub. No.: WO2021/219557
PCT Pub. Date: Nov. 4, 2021

(65) Prior Publication Data
US 2023/0160186 A1   May 25, 2023

(30) Foreign Application Priority Data
Apr. 29, 2020 (EP) .................................... 20382353

(51) Int. Cl.
*E02F 9/28* (2006.01)
*H02N 2/18* (2006.01)

(52) U.S. Cl.
CPC ........... *E02F 9/2808* (2013.01); *H02N 2/186* (2013.01)

(58) Field of Classification Search
CPC ......... E02F 3/32; E02F 9/2808; E02F 9/2883; E02F 9/2816; H02N 2/186; H02N 2/188; G01M 5/0091; G01M 5/0033
See application file for complete search history.

(56) References Cited

U.S. PATENT DOCUMENTS

| | | |
|---|---|---|
| 2010/0096148 A1 | 4/2010 | Chiorean |
| 2012/0235579 A1* | 9/2012 | Chemel .................. F21V 15/01 315/152 |

(Continued)

FOREIGN PATENT DOCUMENTS

| | | |
|---|---|---|
| CN | 108448936 A | 8/2018 |
| EP | 3327205 A1 | 5/2018 |

(Continued)

OTHER PUBLICATIONS

International Search Report, PCT/EP2021/060850 Mailed Jun. 7, 2021.

*Primary Examiner* — Joseph M Rocca
*Assistant Examiner* — Robert E Pezzuto
(74) *Attorney, Agent, or Firm* — Calderone McKay LLC

(57) ABSTRACT

Wear element for an earth-moving machine, corresponding measuring device and machine, in particular an excavating machine, loading machine, dredging machine, or the like. The wear element is provided with a measuring device and further comprising energy harvesting configured for capturing energy derived from an external source with respect to the measuring device and supplying the energy, in the form of electrical energy, to the measuring device.

12 Claims, 5 Drawing Sheets

(56) References Cited

U.S. PATENT DOCUMENTS

2015/0355216 A1* 12/2015 Girardeau .............. G01H 11/08
                                                    73/514.29
2018/0269828 A1*  9/2018 Beck .................... H02S 40/425
2019/0338497 A1  11/2019 Espejo Pina
2020/0393303 A1* 12/2020 Betournay ................ E02F 9/26

FOREIGN PATENT DOCUMENTS

WO      2015179046 A1   11/2015
WO      2016115499 A1    7/2016

* cited by examiner

WEAR ELEMENT FOR AN EARTH-MOVING MACHINE, CORRESPONDING MEASURING DEVICE AND MACHINE

BACKGROUND OF THE INVENTION

Field of the Invention

The invention lies in the field of earth-moving machines, in particular for excavating machines, loading machines, dredging machines, or the like.

More specifically, the invention relates to a wear element for an earth-moving machine provided with a measuring device, for example, an electronic device provided with sensors and/or communication elements.

In the field of the art, wear elements are also known with the name ground engaging tools (GETs). They comprise elements such as: [0004] teeth: they have the function of penetrating the ground and protecting the blade of the excavator shovel; [0005] tooth adapters: it has the function of protecting the blade and bearing teeth; [0006] front guards: they have the function of protecting the lip in the areas comprised between the teeth and also perform the penetration function, but to a lesser degree than the teeth; and [0007] side guards: they protect the sides of the excavator bucket.

The invention also relates to the measuring device configured for use in a wear element.
1. The invention also relates to an earth-moving machine provided with at least one wear element of the type described above.

State of the Art

Wear elements coupled to earth-moving machines are known in the art. In these earth-moving machines, the operating and maintenance cost can be very high. Solutions in which said wear elements are provided with measuring devices which gather direct information about the working of the machine have emerged recently to improve its reliability, productivity and efficiency, reducing the cost per amount of excavated and loaded material, while at the same time intending to prevent unwanted incidents. Taking measurements on wear elements or any element which offers direct information about field work, i.e. information that indicates the changes in the state of said wear elements, allows helping to increase machine efficiency, productivity, and reliability.

For the sake of linguistic simplicity, in the context of this document the term "measuring device" will be used as a broad reference to a device which purpose is to take measurements and possibly to transmit said measurements to an external element. In this sense, the measuring device can be a complex device formed of several parts functionally linked to one another, such as measurement elements, sensors, electronic circuits, antennas, transmitters, receivers, processers, etc.

In general, said measuring device is located in an inner cavity or area of the wear element, although depending on the type of wear element, it can also be found in other locations, even outside said wear element, for example, in an area not subjected to wear located between different wear elements, such as between the tooth and tooth adapter of an excavator, below the guards, etc. Said measuring device must be powered with electrical energy, for example, so that said measuring device can communicate the measurements taken to an external element. However, due to the working conditions, it is difficult to lead power cables to the point where the wear element, and particularly its measuring device, is located. Indeed, these elements are usually exposed to harsh operating conditions, for example, due to the forces they receive, the wear to which the wear elements are subjected, or the extreme temperatures at which they operate, in addition to the environment itself rife with fine particles and stones. Furthermore, wiring solutions require the presence of cables that reach the anchoring points of the wear elements. This limitation restricts the type of earth-moving machines in which solutions of this type can be used, limiting the versatility of the device.

In order to solve the aforementioned problem, solutions in which the measuring device is powered by a battery are known. However, the measuring device must have a service life that is long enough so as to allow it to perform its function, for example, to detect the moment in which the wear element in which the measuring device is incorporated is already too worn out for normal operation. In other cases, there may be a need for the device to be able to transmit a large amount of information throughout the entire service life of the wear element, for example, for performing wear element behavioral studies depending on the type of soil. This service life must furthermore include possible storage stages in which the wear element is not in operation. In this sense, the use of batteries limits the design of the measuring device given that said measuring device must have a very low electrical consumption, which generally means limitations in the functionalities thereof.

Alternatively, it is necessary to provide large-capacity batteries, which is rather inconvenient for elements of this type given that the space available for incorporating elements is limited by the actual size of the wear element and by its structural integrity in operating conditions. Moreover, the service life of batteries may also be compromised due to the extreme usage conditions to which the wear element is exposed and batteries can hardly withstand, for example, very high or very low temperature, the entry of dust or fine particles in the capsule, or the strong impacts which affect the battery securing points. This last example is particularly noteworthy given that said securing points are usually one of the weakest points in electronic devices.

Another problem involving the use of batteries is their high degree of contamination. When batteries are used, there is a need to ensure that the devices are recovered in their entirety for proper recycling, so it increases the time and monetary cost of the maintenance of battery-powered devices.

DESCRIPTION OF THE INVENTION

The purpose of the invention is to provide a wear element of the type indicated above which allows solving the aforementioned problems.

This purpose is achieved by means of a wear element of the type indicated above, characterized in that it further comprises energy harvesting means configured for capturing energy derived from an external source with respect to said measuring device and supplying said energy, in the form of electrical energy, to said measuring device.

The measuring device can therefore be powered as a result of said external energy and not only as a result of internal power sources, which presents various technical advantages. First, wiring from the earth-moving machine to the measuring device is not required. The need to incorporate large-capacity batteries to power the measuring device is also prevented. In some embodiments, it is even possible to dispense with said batteries altogether. Given that the energy does not depend on a battery that gradually becomes depleted, the service life of the measuring device can be increased even when it is not possible to reduce its energy consumption. Additionally, it is a more cost-effective and environmentally friendly system as it has no battery. Likewise, since it does not contain a battery, the device can have smaller dimensions, which results in a lower impact on the mechanical strength of the wear elements.

Preferably, said measuring device comprises a wear sensor, a wear element fall detector, a stress sensor, a wear element location detector, or a combination thereof, in general, any element which is capable of recording changes in the state of the wear elements.

In an advantageous embodiment, said external source comprises a solar, magnetic, electromagnetic, thermal, vibrational energy source, or a combination thereof. This allows feeding the measuring device with energy sources present in the environment of the work areas such as solar energy, with sources resulting from the use of the wear element such as thermal or vibrational energy, or with sources that can be provided externally such as magnetic or electromagnetic energy. The combinations furthermore allow exploiting several types of energy sources.

Preferably, said external source comprises a solar energy source and said energy harvesting means comprise at least one photovoltaic plate. The skilled person will understand that this solution is only possible in particular cases of wear elements that are not subjected to excessively harsh conditions and are usually exposed to the sun. In an advantageous embodiment, said at least one photovoltaic plate is arranged towards the outside of said wear element and protected by means of a transparent protective surface.

Preferably, said external source comprises a thermal energy source and said energy harvesting means comprise at least one thermoelectric cell. Due to friction during the operating conditions, the wear elements tend to heat up. Solutions of this type allow exploiting the temperature difference the wear element may present in different internal areas or between internal areas and the outside of said wear element. Therefore, the actual working conditions provide energy for powering the measuring device.

In a particularly advantageous embodiment, said external source comprises vibrations present in said wear element when said wear element is in a usage position in said earth-moving machine. The wear element is subjected to vibrations during different states in use. In particular, it presents vibrations, for example, when the machine is stopped (due to the engine slowing down, among others), when the machine is moving, when it is excavating the ground, loading material, or unloading material. It is therefore possible to exploit the energy present in a wide range of operating conditions of the wear element.

Preferably, said energy harvesting means comprise a microelectromechanical device, preferably a piezoelectric microelectromechanical device. Devices of this type can be robust enough so as to support the operating conditions to which most wear elements are exposed, which represents a particularly important advantage with respect to the energy source options mentioned above. It is therefore possible to power the measuring devices of wear elements which are exposed to high temperatures and pressures, which could rule out the use of thermoelectric cells or solar panels, for example.

Preferably, said energy harvesting means would be configured for harvesting energy from said vibrations in the range of 30 to 40 Hz, in the range of 80 to 90 Hz, or in both ranges. As described below, it has been experimentally proven that there are pronounced peaks in vibrations for specific working conditions. This may hint at a skilled person to focus the harvesting of vibrations for said peak frequencies. However, although this strategy is recommendable in some cases, for some preferred embodiments it is more convenient to use frequencies which have stable energies for all the operating conditions of the machine, for example, in the standby, moving, loading, and unloading states.

Preferably, said energy harvesting means are configured for harvesting energy from said vibrations in a direction perpendicular to the longitudinal axis of said wear element. This maximizes the oscillation amplitude and, in turn, the amount of energy that can be harvested.

Preferably, the wear element further comprises conditioning and storage means configured for conditioning and storing the electrical energy supplied by said energy harvesting means, so that it can be supplied to said measuring device. This allows the measuring device to receive a stabilized electric current. Furthermore, under conditions of excessive energy the harvested energy can be stored to be used later when there is a harvested energy deficiency.

The invention also relates to a measuring device configured for use in a wear element of an earth-moving machine, comprising energy harvesting means configured for capturing energy derived from an external source with respect to said measuring device and supplying said energy, in the form of electrical energy, to said measuring device. Therefore, said measuring device has the same technical advantages as the case of the wear element described above. Similarly, different embodiments equivalent to those described above can be envisaged. For brevity, the descriptions will not be repeated herein.

The invention also relates to an earth-moving machine provided with at least one wear element according to any of the embodiments described above.

The invention also covers other detail features illustrated in the detailed description of an embodiment of the invention and in the attached drawings.

BRIEF DESCRIPTION OF THE DRAWINGS

The advantages and features of the invention can be seen from the following description in which preferred embodiments of the invention are described in a non-limiting manner with respect to the scope of the main claim in reference to the drawings.

DETAILED DESCRIPTION OF THE INVENTION

Figure 1:
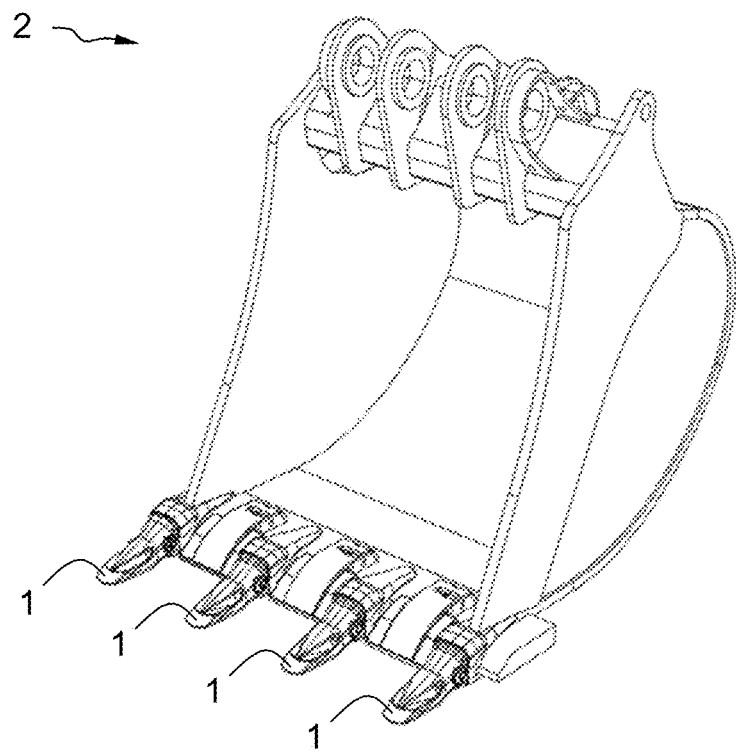
FIG. 1 shows a shovel or bucket of an earth-moving machine provided with several wear elements of the type of the invention.
Figure 2:
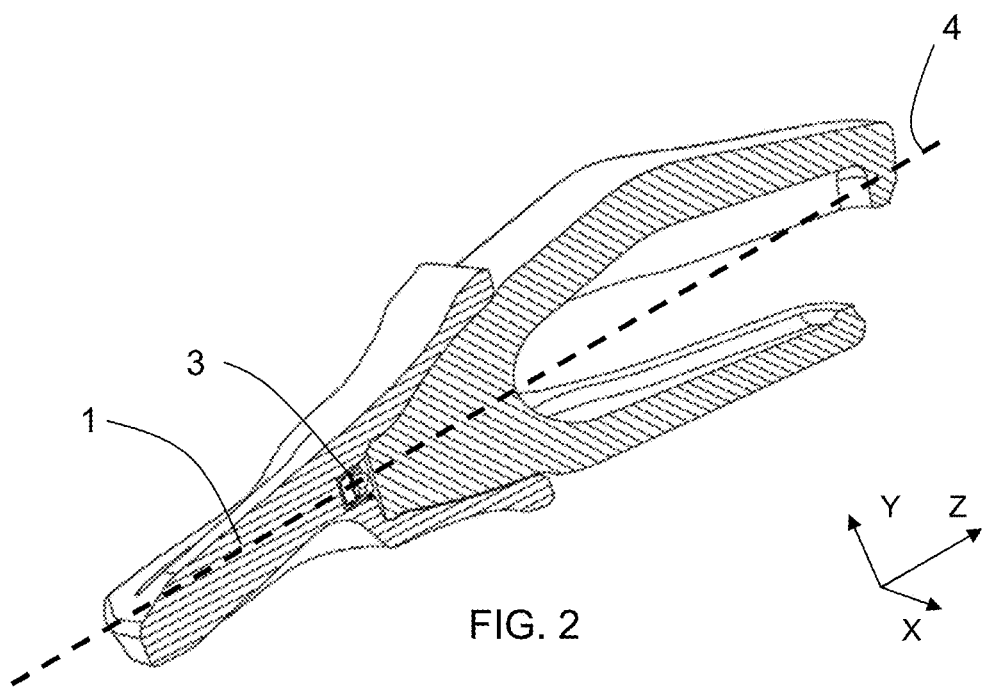
FIG. 2 is a section view of a wear element of the type of the invention and the attachment part for attachment with an earth-moving machine. The figure shows a dashed line representing the longitudinal axis of the wear element. It also includes by way of reference a depiction of the coordinate axes.

FIGS. 1 and 2 show an exemplary embodiment of a wear element 1 for an earth-moving machine 2. As can be seen in FIG. 1, for the case of the example, said machine 2 is an excavator provided with a shovel in which said wear elements 1 are provided. The wear element 1 of the example is an excavator tooth provided with a measuring device 3 located in an inner cavity of the tooth, and configured for detecting the state of wear of the wear element 1. This therefore facilitates maintenance, replacement, fall detection operations, etc. The wear element 1 further comprises energy harvesting means configured for capturing energy derived from an external source with respect to the measuring device 3 and supplying said energy, in the form of electrical energy, to said measuring device 3.

In the first embodiment, the external source comprises vibrations present in said wear element 1 when said wear element 1 is in a usage position in said earth-moving machine 2, as shown in FIG. 1 and FIG. 2. In particular, for the case of this first embodiment, the energy harvesting means comprise a piezoelectric microelectromechanical device 103. Other embodiments may comprise devices of another type the functionality of which allows converting vibrations into electrical energy.

Figure 3A:
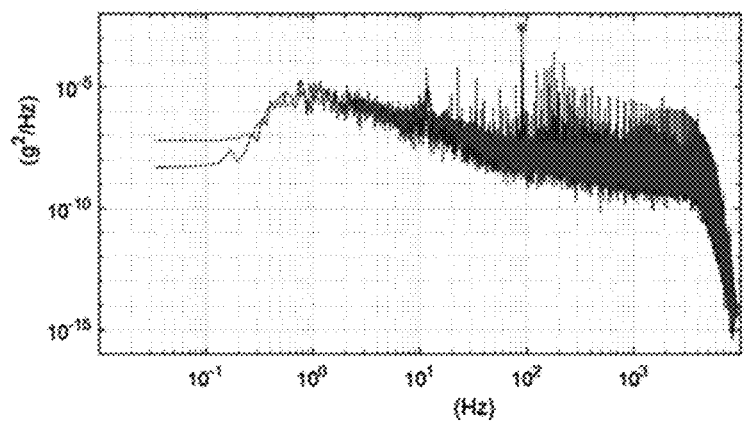
FIGS. 3A to 3D show graphs in which the magnitude of the vibration is depicted with respect to its frequency for different working conditions of the earth-moving machine.
Figure 3B:
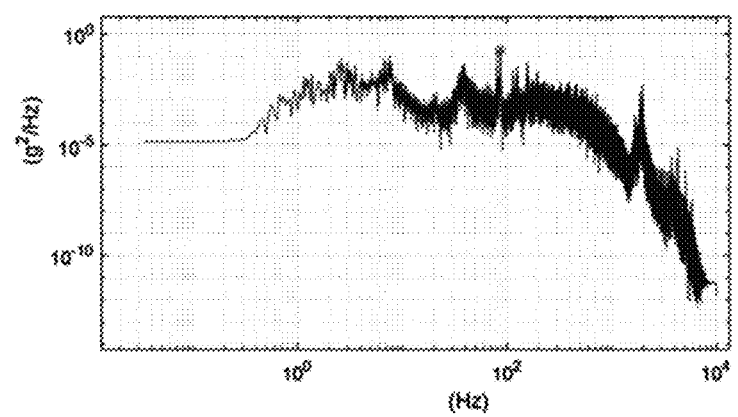
Figure 3C:
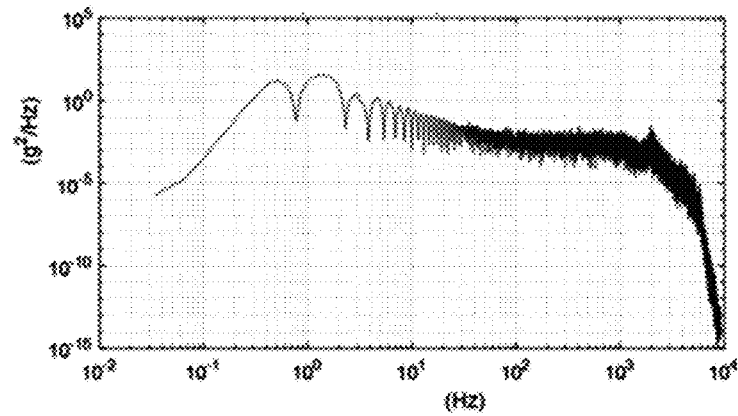
Figure 3D:
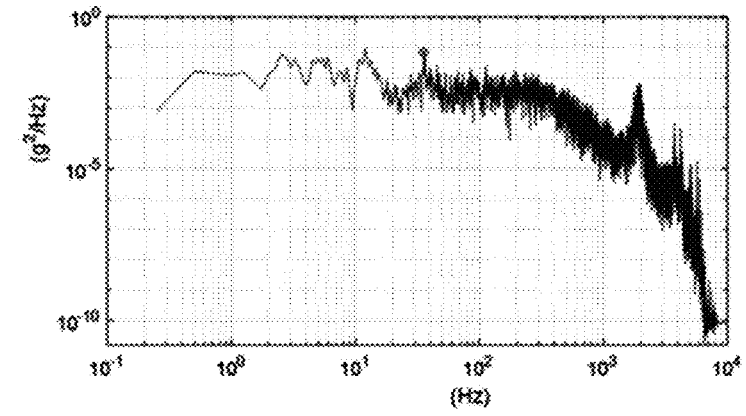

Experimental tests have been conducted to determine the range of vibration frequencies that optimize energy attainment during the working conditions of the earth-moving machine of the first embodiment. FIGS. 3A to 3D show graphs in which the magnitude of the vibration is depicted with respect to its frequency. FIG. 3A shows the vibrations when the machine is in standby but with the engine on, where it is actually two superimposed graphs that cannot be differentiated from one another due to the limitations of representation in black and white, one graph corresponding to the machine itself and the other being a measurement corresponding to noise. In any case, the identified peak corresponds to the measurement of the machine. FIG. 3B shows the vibrations with the machine in motion, that is, moving traveling from one place to another. Said vibrations have another peak close to the preceding one. FIG. 3C shows the vibrations with the machine loading the material, in this case without any notable peaks. Finally, FIG. 3D shows the vibrations with the machine unloading the material. In this case, there is another peak in a lower frequency than the preceding ones.

Therefore, for the first embodiment, the energy harvesting means are configured for harvesting energy from said vibrations in the range of 80 to 90 Hz, which corresponds to maximizing the harvesting of energy in the case of the machine in standby or in motion. In other embodiments, the range is 30 to 40 Hz for optimizing material unloading operations. Still in other embodiments, both ranges are used simultaneously. Other ranges can also be envisaged in the case of machines or wear elements having different characteristics and involving vibrations with peaks centered in other ranges.

For the first embodiment, the energy harvesting means are configured for harvesting energy from said vibrations in a direction perpendicular to the longitudinal axis 4 of the wear element 1. Specifically, in the first embodiment the piezoelectric device 103 gathers vibrations on the Y axis shown in FIG. 2. As can be observed, the longitudinal axis 4 corresponds with the coordinate axis Z. Depending on the type of wear element, its fixing, and its operative movement, other embodiments harvest vibrations in a direction of plane XY, or even in other directions transverse to the longitudinal axis 4.

In the first embodiment, the wear element 1 further comprises conditioning and storage means configured for conditioning and storing the electrical energy supplied by said energy harvesting means, such that it can be supplied to said measuring device 3. In particular, for this embodiment the storage means are a battery and the conditioning means are an electronic circuit comprising an electrical rectifier for conditioning the electrical signal together with a battery for storing same. In this example, the battery is used for powering the measuring device 3.

Figure 4A:
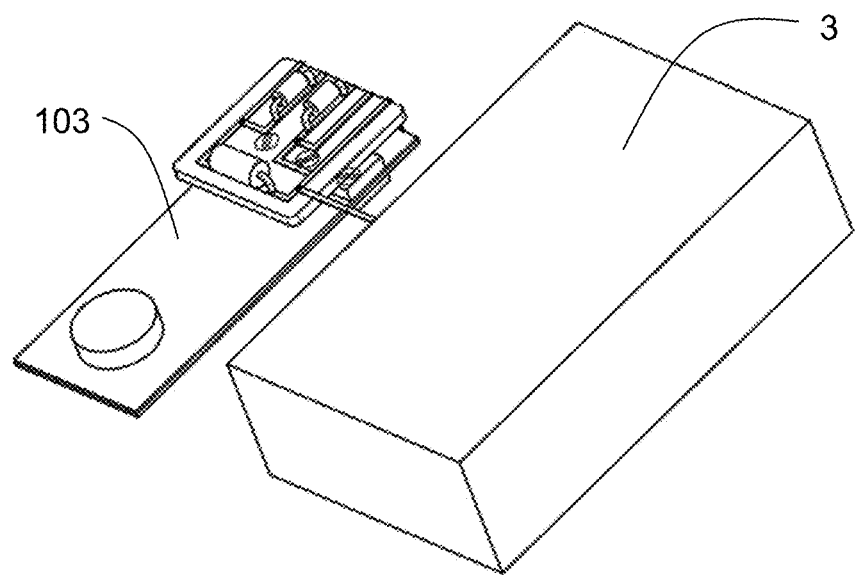
FIGS. 4A and 4B show diagrams of a measuring device powered by two embodiments of the piezoelectric device.
Figure 4B:
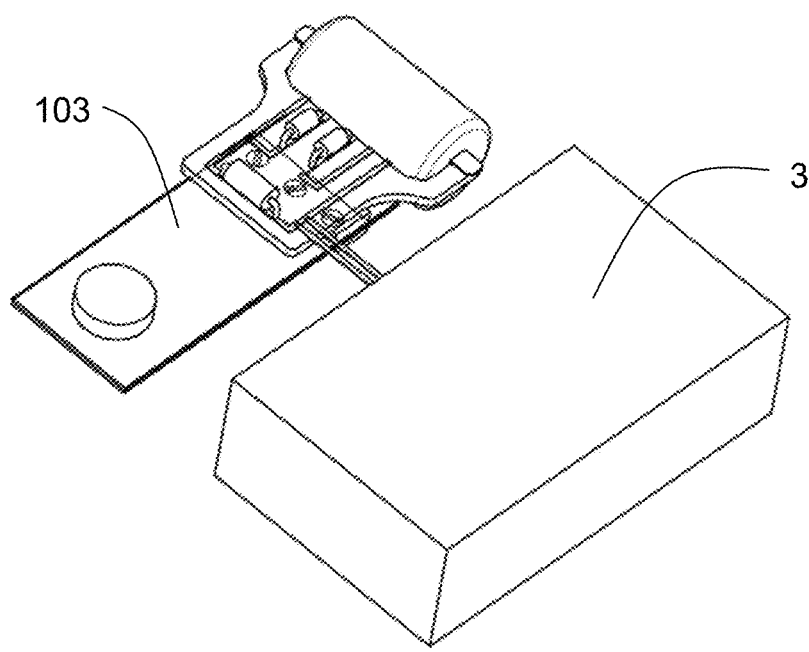

FIGS. 4A and 4B show conceptual diagrams of a measuring device 3 powered by a piezoelectric device 103. By way of comparison, the case of FIG. 4A in which power is supplied directly from the piezoelectric 103 to the measuring device 3 is included. The diagram shown in FIG. 4B corresponds with the first embodiment herein described. In this case, a battery which is powered from the piezoelectric 103 through an electronic rectification circuit is provided.

Other embodiments of the wear element 1 according to the invention sharing many of the features described in the preceding paragraphs are shown below. Accordingly, only the differentiating elements will be described hereinafter, whereas reference is made to the description of the first embodiment for the common elements.

In some embodiments, the external source comprises a solar, magnetic, electromagnetic, thermal, vibrational energy source, or a combination thereof.

Figure 5:
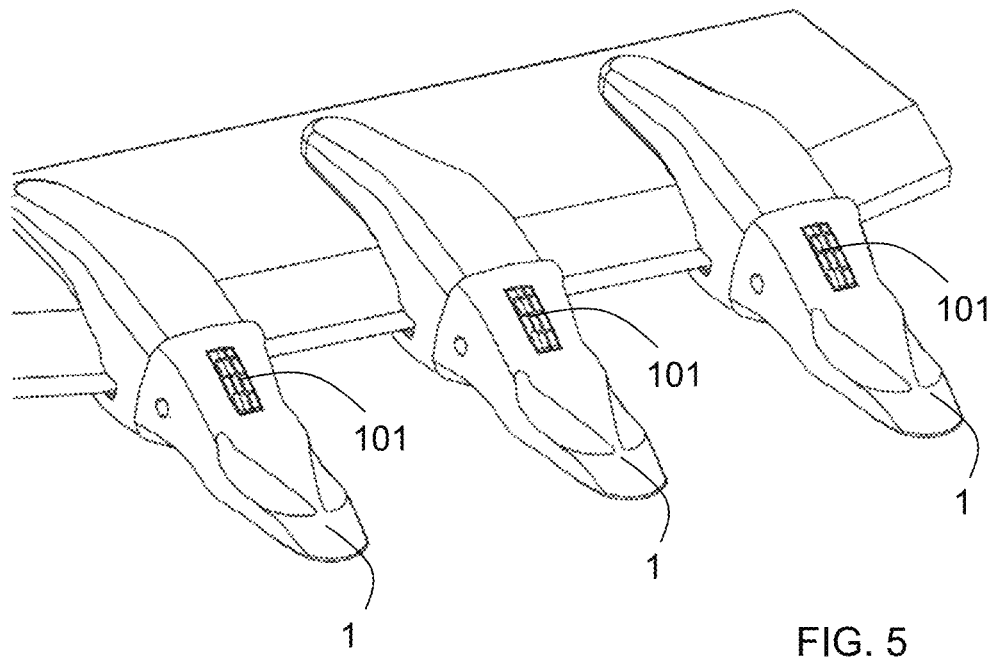
FIG. 5 is a detailed view of a shovel with wear elements provided with solar energy harvesting means.

In some embodiments, such as the one shown in FIG. 5, said external source comprises a solar energy source and said energy harvesting means comprise at least one photovoltaic plate 101.

In particular, FIG. 5 shows an embodiment in which wear elements are provided with photovoltaic plates 101 which receive solar energy and transform it into electrical energy. In this embodiment, said photovoltaic plates 101 are arranged facing the outside of the wear element and protected by means of a transparent surface.

In other embodiments, said external source comprises a thermal energy source and said energy harvesting means comprise at least one thermoelectric cell 102. In particular, FIGS. 6A, 6B, 6C, and 7 show different configurations for said thermoelectric cell 102 inside a wear element. Each of said figures shows two types of wear elements fitted to one another, the one located in the top part of the figure is an excavator tooth, whereas the element that is fitted to said tooth is known as a tooth adapter. Said FIGS. 6A-6C and 7 are all horizontal section views of the same type of wear elements.

Figures 6A, 6B, 6C:
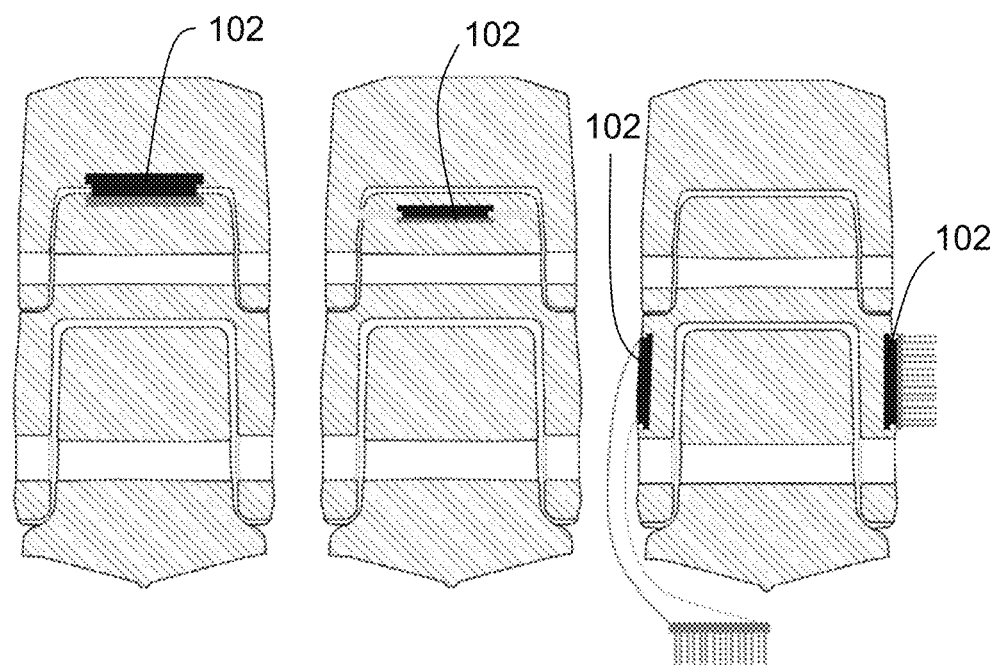
FIGS. 6A, 6B, 6C, and 7 are section views showing different configurations for a thermoelectric cell inside a wear element.

In the embodiment of FIG. 6A, the thermoelectric cell 102 is provided inside the tooth.

Likewise, a thermal barrier going through the thermoelectric cell to facilitate heat flow through same has been provided.

The embodiment of FIG. 6B is equivalent to that of FIG. 6A but, in this case, the wear element is provided in the tooth adapter.

In the embodiment of FIG. 6C, the tooth adapter is provided with two thermoelectric cells 102, in opposite side walls. Radiator elements connected to the thermoelectric cell 102 for optimizing the thermal difference, and accordingly, the amount of obtainable electrical energy, have been schematically depicted in the figure. The figure shows two options for said radiator elements: one in direct contact with the cell 102, located on the right side of the figure, and another located away from the cell and connected by means of a thermal conductor. This last case has the advantage of the radiator element being located away from the area potentially exposed to wear. FIG. 6C depicts two preferred options for the arrangement of the thermoelectric cells 102, however, embodiments with a single cell 102 arranged according to one option or another may be envisaged.

Figure 7:
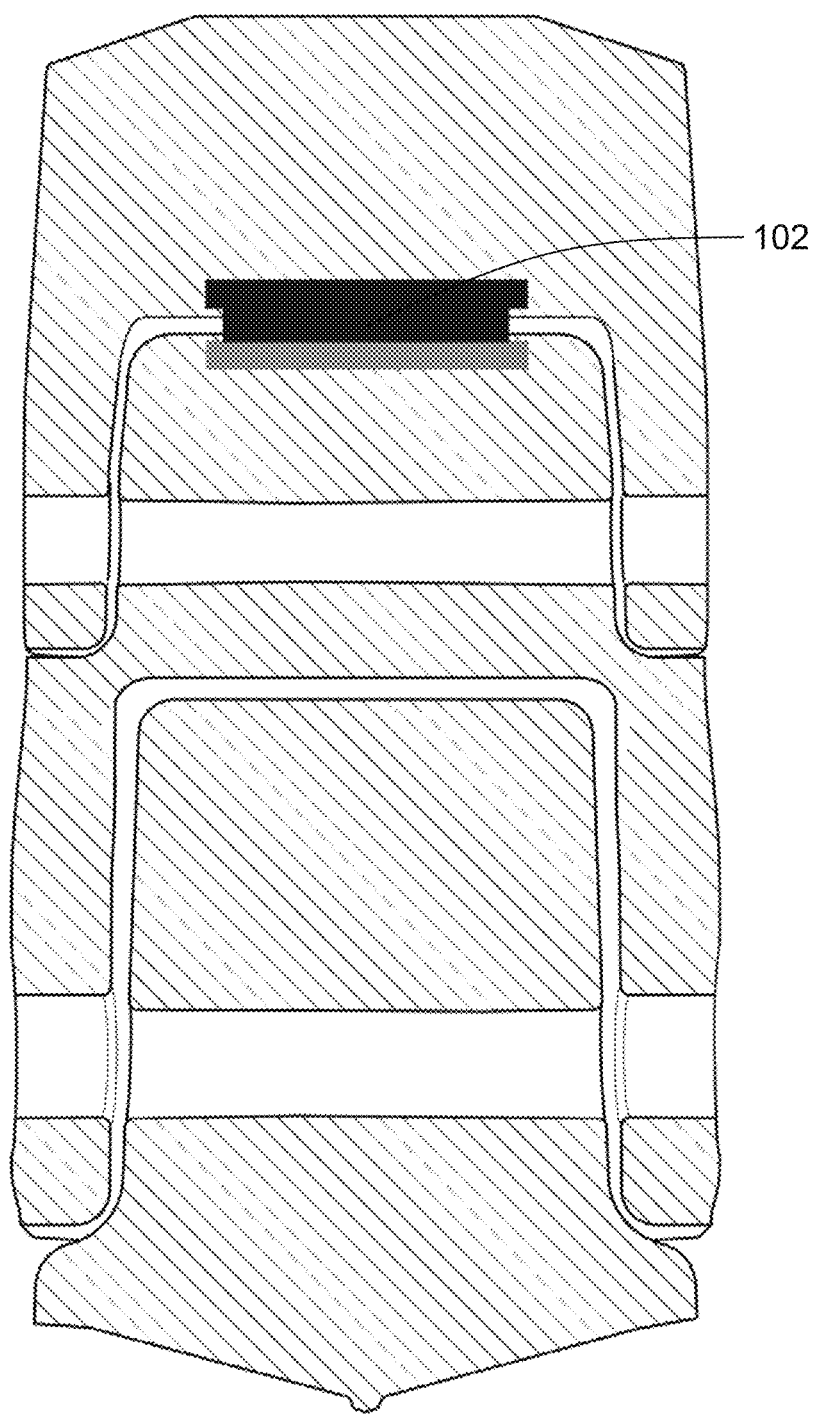

FIG. 7 shows another embodiment in which the thermoelectric cell 102 is provided in the interface existing between the tooth and the tooth adapter. In this case, a dedicated thermal barrier is not provided given that a shielding effect which increases the temperature difference in the thermoelectric cell 12 already occurs between the two parts.

The invention claimed is:

1. A wear element for an earth-moving machine comprising a measuring device and energy harvesting means configured for capturing energy derived from an external source with respect to said measuring device and supplying said energy, in the form of electrical energy, to said measuring device, wherein said external source comprises a thermal energy source and said energy harvesting means comprise at least one thermoelectric cell, said external source further comprises vibrations present in said wear element when said wear element is in a usage position in said earth-moving machine, wherein said energy harvesting means are further configured for harvesting energy from said vibrations in a range of frequencies from 80 to 90 Hz and wherein said wear element is a tooth adapter having a tooth mounted thereto, and said at least one thermoelectric cell are two thermoelectric cells arranged in opposite side walls of said wear element.

2. The wear element according to claim 1, further comprising radiator elements connected to said thermoelectric cells, wherein each of said radiator elements is independently in direct contact with said thermoelectric cell or away from said thermoelectric cell and connected by means of a thermal conductor.

3. The wear element according to claim 1, wherein said energy harvesting means are further configured for harvesting energy from said vibrations in a range of frequencies from 30 to 40 Hz.

4. The wear element according to claim 1, wherein said energy harvesting means comprise a microelectromechanical device.

5. The wear element according to claim 1, wherein said measuring device is selected from the group consisting of a wear sensor, a stress sensor, a wear element fall detector, and a wear element location detector, or a combination thereof.

6. The wear element according to claim 1, wherein said external source the energy source further comprises one or more energy sources selected from the group consisting of solar, magnetic, electromagnetic and vibrational or a combination thereof.

7. The wear element according to claim 1, further comprising conditioning and storage means, the conditioning and storage means configured for conditioning and storing the electrical energy supplied by said energy harvesting means.

8. An earth-moving machine provided with at least one wear element according to claim 1.

9. The wear element according to claim 1, wherein said energy harvesting means comprise a piezoelectric microelectromechanical device.

10. A wear element for an earth-moving machine comprising a measuring device and an energy harvesting means configured for capturing energy derived from an external source with respect to said measuring device and supplying said energy, in the form of electrical energy, to said measuring device, wherein said external source comprises a thermal energy source and said energy harvesting means comprise at least one thermoelectric cell wherein said energy harvesting means are configured for harvesting energy from said vibrations in a direction perpendicular to a longitudinal axis of said wear element.

11. A wear element for an earth-moving machine comprising a measuring device and an energy harvesting means configured for capturing energy derived from an external source with respect to said measuring device and supplying said energy, in the form of electrical energy, to said measuring device, wherein said external source comprises a thermal energy source and said energy harvesting means comprise at least one thermoelectric cell wherein said external source further comprises a solar energy source and said energy harvesting means further comprise at least one photovoltaic plate.

12. The wear element according to claim 11, wherein said at least one photovoltaic plate is arranged towards the outside of said wear element and protected by means of a transparent protective surface.

* * * * *